(12) United States Patent
Dent

(10) Patent No.: US 7,050,802 B2
(45) Date of Patent: May 23, 2006

(54) CELLULAR COMMUNICATION DEVICE WITH SCANNING RECEIVER AND CONTINUOUS MOBILE COMMUNICATION SYSTEM EMPLOYING SAME

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 469 days.

(21) Appl. No.: 10/421,082

(22) Filed: Apr. 23, 2003

(65) Prior Publication Data

US 2004/0110506 A1    Jun. 10, 2004

Related U.S. Application Data

(62) Division of application No. 09/196,005, filed on Nov. 19, 1998, now Pat. No. 6,591,100.

(51) Int. Cl.
*H04Q 7/20* (2006.01)
*H04B 7/00* (2006.01)
*H04B 1/18* (2006.01)
*H04M 1/00* (2006.01)

(52) U.S. Cl. ............... 455/434; 455/464; 455/516; 455/550.1; 455/161.1; 455/161.2; 455/164.1; 455/168.1

(58) Field of Classification Search .. 455/435.1–435.2, 455/424–425, 434, 422.1, 436–453, 455, 455/500, 502, 509–517, 550.1, 553.1, 561, 455/562.1, 161.1–161.2, 161.3, 164.1, 164.2, 455/168.1, 167.1, 179.1, 180.1, 230, 166.1, 455/185.1, 197.1, 269, 334, 343.1, 62, 464, 455/574, 254–255, 234.2; 375/260, 350; 342/371

See application file for complete search history.

(56) References Cited

U.S. PATENT DOCUMENTS

| | | | | | |
|---|---|---|---|---|---|
| 5,159,593 | A | * | 10/1992 | D'Amico et al. | 370/95.3 |
| 5,195,108 | A | * | 3/1993 | Baum et al. | 375/84 |
| 5,249,303 | A | * | 9/1993 | Goeken | 455/134 |
| 5,267,261 | A | * | 11/1993 | Blakeney, II et al. | 375/34.2 |
| 5,390,365 | A | * | 2/1995 | Enoki et al. | 455/54.1 |
| 5,606,575 | A | * | 2/1997 | Williams | 375/219 |
| 5,649,000 | A | | 7/1997 | Lee et al. | |
| 5,649,308 | A | * | 7/1997 | Andrews | 370/334 |
| 5,758,266 | A | * | 5/1998 | Kornfeld et al. | 455/86 |
| 5,774,809 | A | * | 6/1998 | Tuutijarvi et al. | 455/437 |
| 5,812,609 | A | * | 9/1998 | McLochlin | 375/340 |
| 5,912,925 | A | * | 6/1999 | Palermo et al. | 375/258 |
| 6,009,130 | A | * | 12/1999 | Lurey et al. | 375/347 |
| 6,014,571 | A | * | 1/2000 | Enoki | 455/550 |
| 6,075,989 | A | * | 6/2000 | Moore et al. | 455/436 |
| 6,078,570 | A | * | 6/2000 | Czaja et al. | 370/331 |

(Continued)

FOREIGN PATENT DOCUMENTS

DE       3506912 A  *  8/1986

(Continued)

*Primary Examiner*—William Trost
*Assistant Examiner*—Meless Zewdu
(74) *Attorney, Agent, or Firm*—Coats & Bennett, P.L.L.C.

(57) ABSTRACT

A receiver receives communication signals on an assigned frequency channel while monitoring the signals received on other frequency channels. A communication processor processes the received communication signals from the current base station while a wideband digitizer processes received filtered signals on the other frequency channels, which correspond to the neighboring base stations. The wideband digitizer generates numerical samples representing the filtered signals in response to a control signal generated by a control processor. The control processor then determines characteristic signals of the frequency channels.

17 Claims, 8 Drawing Sheets

U.S. PATENT DOCUMENTS

| | | | |
|---|---|---|---|
| 6,108,548 A * | 8/2000 | Furukawa et al. | 455/442 |
| 6,112,086 A * | 8/2000 | Wala | 455/434 |
| 6,167,099 A * | 12/2000 | Rader et al. | 375/347 |
| 6,205,334 B1 * | 3/2001 | Dent | 455/434 |
| 6,393,289 B1 * | 5/2002 | Bunting et al. | 455/445 |
| 6,473,602 B1 * | 10/2002 | Bottomley | 455/226.1 |
| 6,553,229 B1 * | 4/2003 | Dent | 455/434 |
| 6,836,660 B1 * | 12/2004 | Wala | 455/434 |

FOREIGN PATENT DOCUMENTS

| | | |
|---|---|---|
| EP | 0 749 256 A2 | 12/1996 |
| EP | 0 876 005 A2 | 11/1998 |
| WO | WO 95/08901 | 3/1995 |
| WO | WO 98/19479 * | 5/1998 |
| WO | WO 98/19491 * | 5/1998 |

* cited by examiner

CELLULAR COMMUNICATION DEVICE WITH SCANNING RECEIVER AND CONTINUOUS MOBILE COMMUNICATION SYSTEM EMPLOYING SAME

The present invention is a divisional application of U.S. application Ser. No. 09/196,005, filed Nov. 19, 1998 now U.S. Pat. No. 6,591,100.

BACKGROUND OF THE INVENTION

This invention relates generally to radio receivers and, more particularly, to radio receivers used in cellular telephones and to cellular telephone systems.

In cellular telephone communication systems, mobile telephones roam from the geographical limits, or cell, of one base transceiver at which the carrier frequency strength is dominant to another, usually adjacent, cell where the carrier frequency strength of the other cell is dominant. A mobile service center having a land based connection with a land based public telephonic system provides a land based connection with a plurality of base station receivers spatially distributed across a geographical service area associated with the mobile service area. Multiple mobile service centers have service areas in contiguous relationship. Because radio carrier frequency signal strength diminishes quickly with distance from the transmitter, it becomes necessary to provide a "hand-over" procedure in the communication protocol. Pursuant to the hand-over protocol it is determined that a particular mobile telephone has moved from a point within the service area of the cell of a base station to a location at which the carrier frequency signal strength has become weaker than the carrier of an adjacent base station and service of the mobile telephone is transferred from the one base station to the adjacent base station. This transfer, or hand-over, is performed under control of the mobile service center in response to input hand-over signals from the one base station currently servicing the mobile telephone.

In the analog cellular mobile telephone system used in the United States and known as AMPS (American Mobile Phone System), the mobile phones transmit and receive continuously during a call, and no scanning of other base stations for signal strength is performed during a call. This is one type of a continuous communication system. Instead, each base station incorporates a scanning receiver that searches for mobile telephones approaching the associated territorial limits of its service area from an adjacent base station. Thus, base stations in AMPS were burdened with the cost of hardware over and above that required for the communications capability being provided by them.

In digital, noncontinuous, cellular telephone communication systems employing time division multiple access (TDMA), such as the D-AMPS communication system used in the United States and the GSM system used in Europe, time-slotted transmission is employed to allow mobile assisted handover scanning during time periods when there is neither transmission nor reception of informational content carrying communication signals representing the voice messages of the parties to the communication. In these TDMA cellular, noncontinuous, communication systems, during each one of successive periodic communication cycles, or frames, the mobile cellular telephone receives digital data representing coded speech during a first timeslot, transmits digitally coded speech to the base station during a second timeslot, and momentarily retunes the receiver to another frequency to evaluate the signal from another base station during a third time slot. The cycle, or TDMA frame, is repeated at a rate of fifty to three hundred times per second, depending on the system. Only one of the plurality of different base station carrier frequencies is scanned during each TDMA frame which, accordingly, results in fifty to three hundred measurements per second. Recurring measurements of the same carrier frequency are averaged, and the average signal strength of each scanned carrier frequency channel is reported approximately once per second. The mobile telephone sends the scanning report to the currently servicing base station by multiplexing the signal reports with the digitally encoded speech transmitted to the base station during the second, or transmission, period.

In continuous digital communication systems employing frequency division multiple access (FDMA) and code division multiple access (CDMA) protocols, such as the protocol of the IS95 system used in the United States, a return has been made to continuous transmission and reception of the formerly employed analog systems in which there are no periods during which informational content carrying communication signals, or communication signals, are not being transmitted or received. Consequently, as in the case of the prior analog continuous communication systems, in the digital, continuous communication systems, the mobile receiver of the prior art is not able to participate in monitoring for strength of the base station carrier signals of adjacent stations in order to advise the current base station if there is a stronger and probably closer base station to which a handover should be made. The current invention solves this problem by allowing the mobile to make handover measurements without interrupting traffic.

SUMMARY OF THE INVENTION

In accordance with the present invention, these hand-over problems and disadvantages of the known continuous communication systems are overcome by provision of a mobile telephone with means responsive to the receiving means for monitoring the plurality of different frequency carrier reception channels respectively associated with a plurality of different base station transmitters for carrier frequency signal strength contemporaneously with receiving informational content carrying signals by the receiving means.

In an embodiment, the communication device transmits a monitor report to the current base station concurrently with the transmission of the informational content carrying signals by embedding the monitor report in the informational content carrying signals. The current base station uses the monitor report to initiate transfer of service for the mobile communication device to the base station with the strongest carrier signal strength by sending appropriate signals to the mobile switching center that in turn signals the base station to take over service for the mobile communication device. Preferably, a wideband digitizing circuit obtains amplified wideband analog signals from the receiver before channel filtering and demodulation, and converts them to complex digital samples. The digital samples are obtained at a rate greater than the Nyquist rate for the total scanned bandwidth but are only taken during a very short time interval commensurate with the reciprocal of the channel spacing, thereby reducing power consumption to a minimum. The digital samples are then operated on by a microprocessor or signal processor to determine energy in a plurality of channels, preferably using a fast Fourier transform. The analysis results in an indication of the channels containing the strongest signals and this information is provided in the monitor report sent to the current base station. While the invention is applicable in connection with continuous transmission and reception protocols, it is alternatively applicable in timeslotted systems for increasing the number of channels that can be scanned per unit of time.

BRIEF DESCRIPTION OF THE DRAWINGS

The foregoing advantageous features will be explained in detail and other advantageous features of the invention will be made apparent from the following detailed description of the preferred embodiment of the invention that is given with reference to the several views of the drawing, in which.

DETAILED DESCRIPTION

Figure 1:
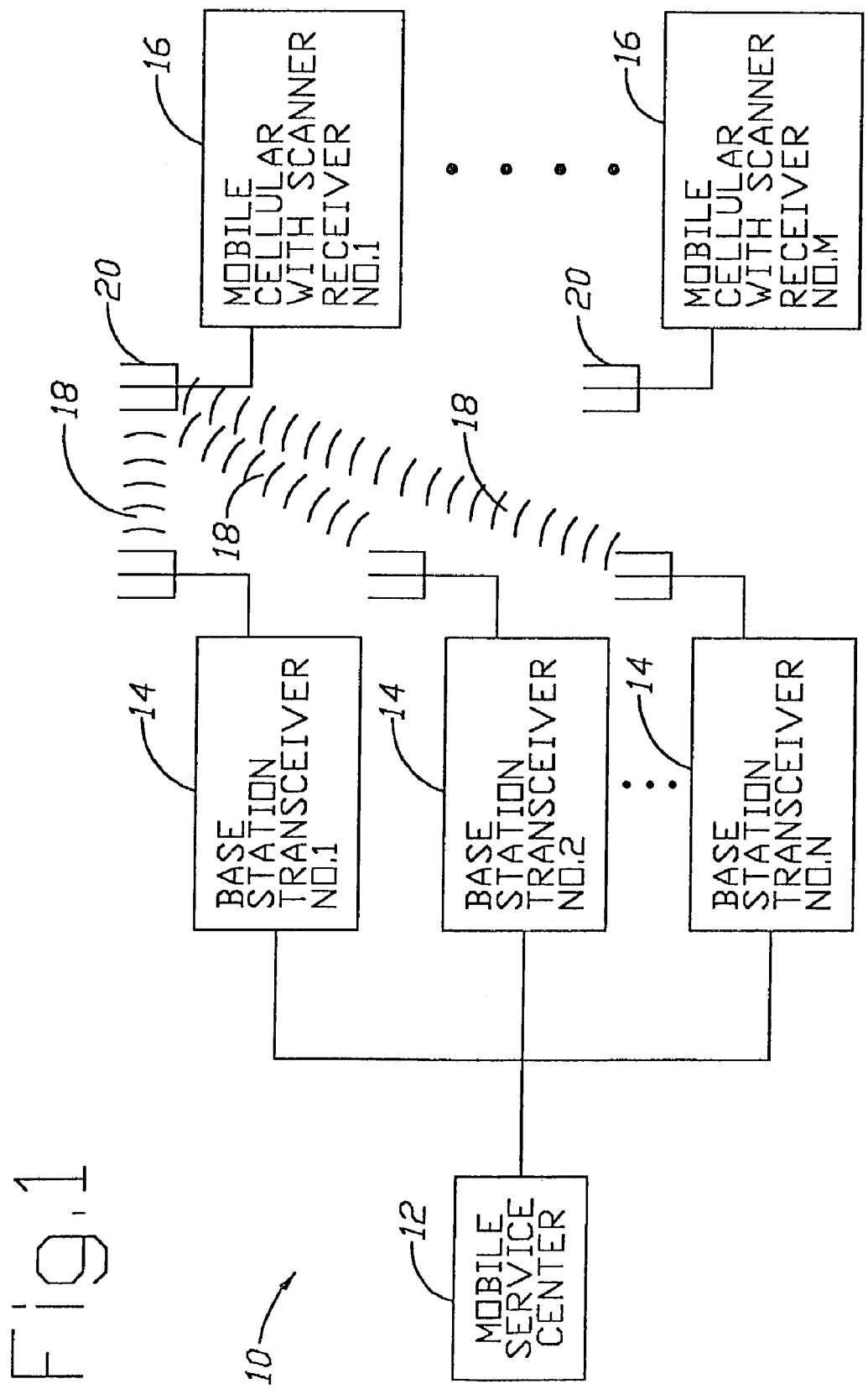
FIG. 1 is a functional block drawing of the preferred embodiment of the cellular communication system of the present invention.

Referring now to FIG. 1, the preferred embodiment of the cellular communication system 10 of the present invention is seen to include a mobile service center 12 for interfacing a plurality of substantially functionally identical base station radio transceivers, or base stations, 14, individually numbered one through N, with a public telephone network (not shown). The public telephone network, in turn, interfaces with other mobile service centers and other telephonic switches and other communication apparatus (not shown). The radius of a cell depends on how far transmitted signals can propagate from a base station 14 to a mobile station 16 and still be picked up at adequate strength by mobile antenna 20. The antennas pick up radio waves from not only the servicing base station 14 but also from adjacent base stations 14 and from other sources. The radio waves, or radio signals, of different base stations 14 may have different frequencies. A prior art mobile phone 16 can, however, only tune to one frequency at once. The radio wave has a signal strength that is at a maximum level adjacent to the base station 14 and diminishes towards the perimeter of the associated cell to a minimum useable level.

Within each cell is a plurality of similar mobile cellular telephones 16, constructed and operated preferably in accordance with the present invention and individually numbered one through M. The mobile telephones 16 are free to roam from one cell to another but are adapted to communicate principally via one of the base stations 14 at any one time. At the border of two or more cells, it is possible that a mobile communicates with two or more nearest base stations using macrodiversity. As a mobile telephone 16 moves out of the geographical area of one cell of a currently servicing base station 14 providing the mobile telephone 16 with mobile communication service, i.e., the current base station, the signal strength of the carrier signal of the current base station 16 becomes so reduced that good quality communication via the current base station 14 becomes difficult and ultimately impossible.

The plurality of cells are generally contiguous with each other and overlapping at their perimeters so that as a roaming mobile telephone 16 leaves the currently servicing cell it enters another adjacent cell. As the roaming mobile telephone enters the adjacent cell, a hand-over procedure is required to "hand-over" the roaming telephone 16 to the adjacent base station 14 which thereafter becomes the new currently servicing base station. Macrodiversity may be employed during the transition from one base to another, thereby achieving a "soft" handoff.

The cellular communication system 10 can operate in accordance with a communication protocol, such as the IS95 code division multiple access system, in which the entire communication cycle is devoted to the transmission of content carrying communication signals, such as encoded digitized speech or other sound, and there is no time leftover for measuring signal strength of other base stations on different frequencies when using mobile receivers of the prior art. However, unlike the known continuous communication systems, when using the inventive mobile units 16, they nevertheless make such signal strength measurements and thus communication system 10 does not burden the base stations 14 with all the responsibility of determining when hand-over should occur. Instead, the cellular communication system 10 employs a mobile assisted scanning procedure previously only possible with TDMA systems pursuant to which the mobile telephones provide an indication to the current base station 14 of the carrier signal strength of the adjacent base stations. This indication of carrier signal strength of the adjacent base stations 14 is conveyed by the current bases station 14 to the mobile service center 12 which uses the indication to determine when and to which adjacent base station servicing of the roaming mobile telephone 16 should best be switched from the current base station 14.

As will be explained in detail below with reference to FIGS. 2–4, each of the mobile telephones 16 has a receiver for selectively tuning in one of the base stations 14 for receiving informational content carrying communication signals from the one of the plurality of base stations and means for monitoring the different radio frequency channels of the plurality of the other adjacent base stations 14 for radio frequency signal strength contemporaneously with continuous communication between the mobile telephone 16 and the current base station 14. Unlike the slow and relatively inefficient sequential scanning performed in known noncontinuous (e.g. TDMA) communication systems noted above, scanning is preferably performed by receiving a wideband signal and by use of appropriate mathematical analysis of the wideband signal performed at the mobile telephone 16. The energy in different radio frequency channels is determined all at once without disrupting the continuous communication in either direction. This wideband scanning approach is also used advantageously in a noncontinuous system to improve the speed of scanning, for which however, there is at least a conventional, prior art method. However, there is no such prior art method available for use in continuous communications systems, for which therefore the invention is of greater importance.

In the continuous communication system 10, preferably, a monitor report is sent from the mobile telephone 16 to the currently servicing base station 14 in combination with transmission of encoded informational content carrying signals originating from the mobile cellular telephone, preferably by transmitting the monitor report on the slow associated control channel (SACCH) which is multiplexed with speech. The monitor report is relayed by the current base center 14 to the mobile service center 12 which responds to the report to effect a hand-over of mobile telephonic communication service from the current base station 14 to another one of the base stations, generally the one reported in the monitor report as having the largest or one of the largest signals being received by the mobile telephone 16 sending the monitor report.

Figure 2:
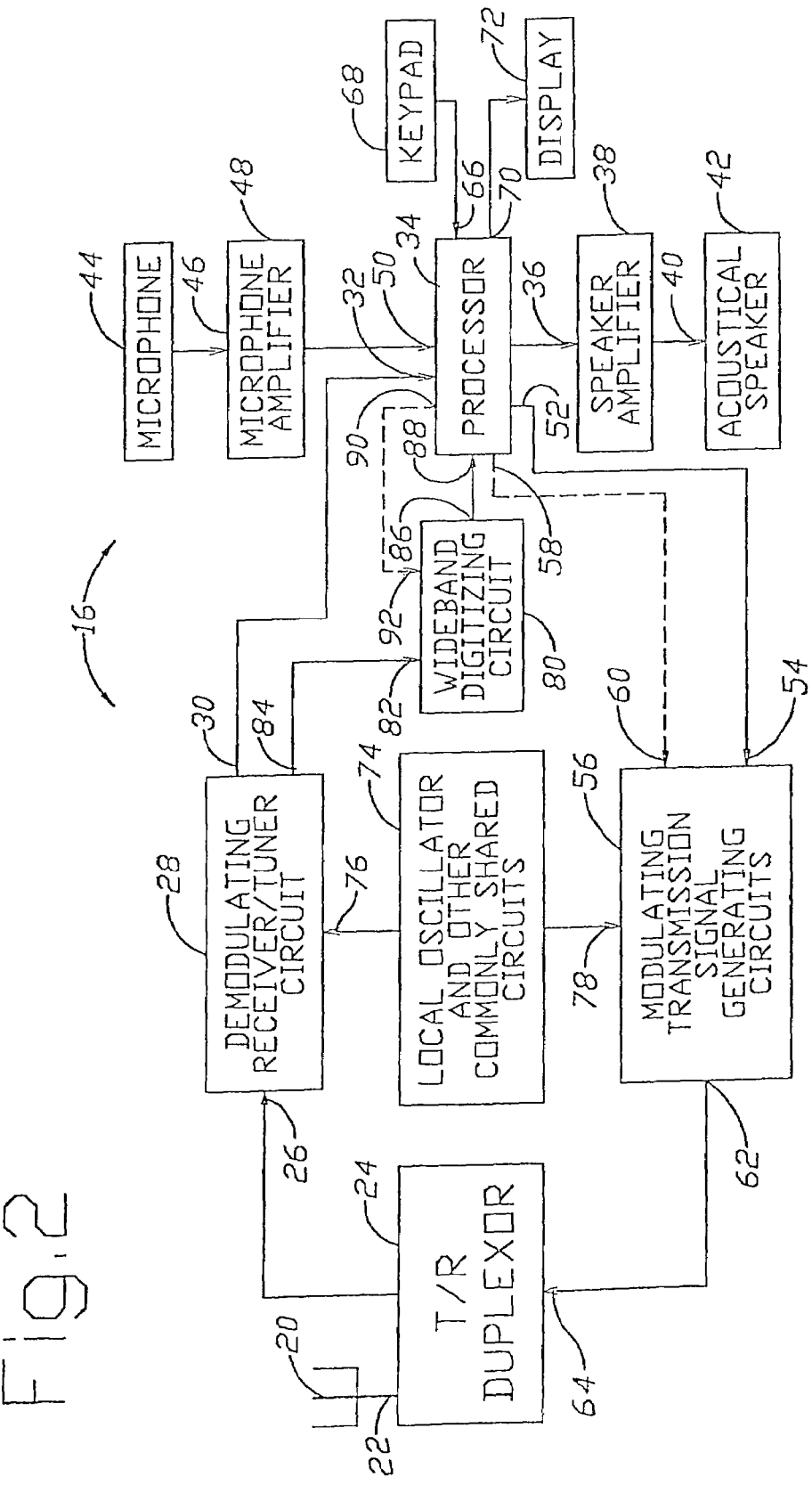
FIG. 2 is a detailed functional block diagram of the preferred embodiment of the mobile cellular telephone of the present invention shown as a single block in the communication system of FIG. 1.
Figure 3:
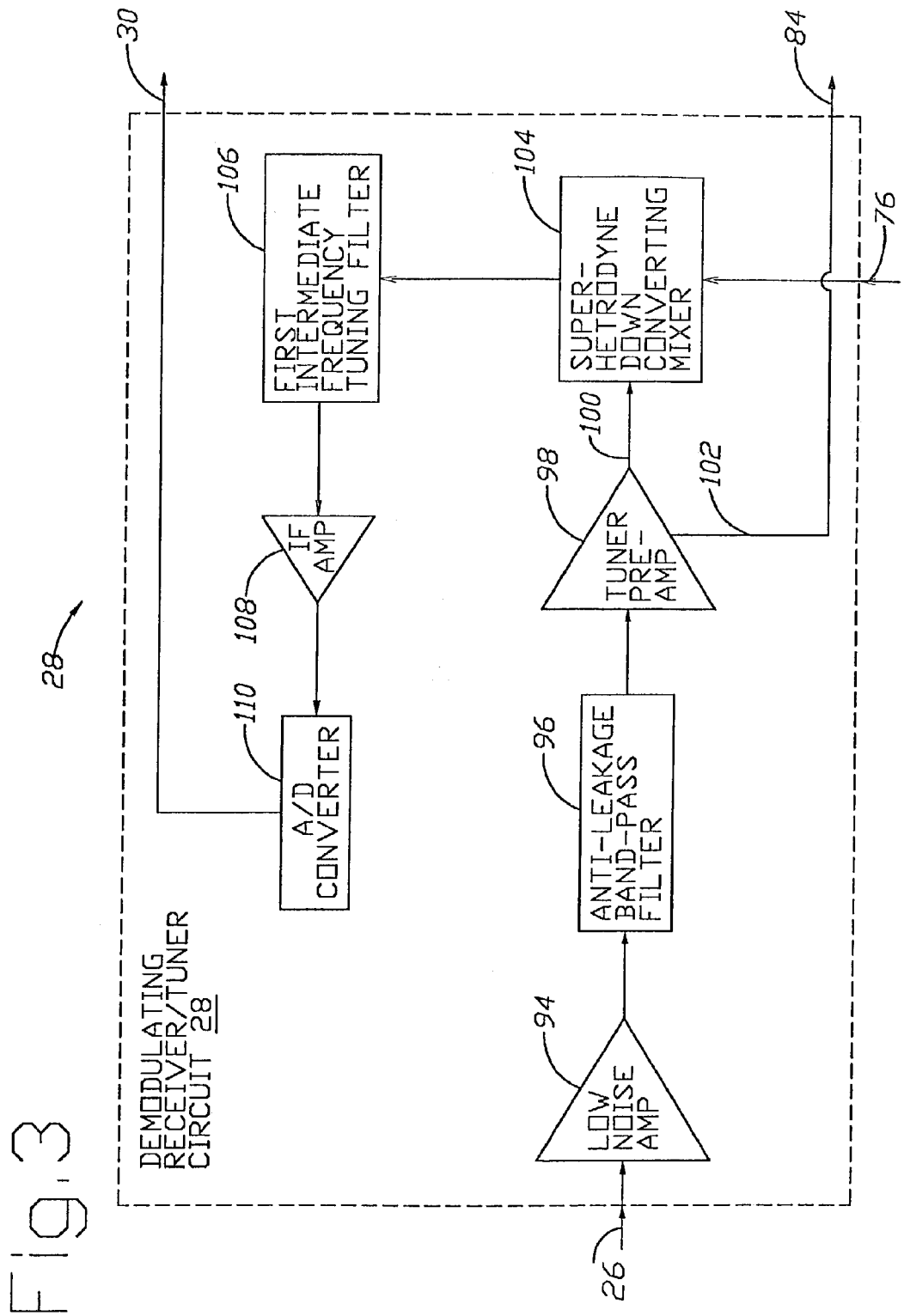
FIG. 3 is a detailed functional block diagram of the preferred embodiment of the demodulating receiver/tuner circuits shown as a single functional block in FIG. 2.

Referring to FIG. 2, the preferred embodiment of the mobile cellular telephone 16 is seen to have the antenna 20 coupled to an input 22 of a transmitting and receiving duplexing bandpass filter, or T/R duplexor, 24 which passes a relatively wideband of frequencies, that may include the entire range of channel frequencies of all the base stations 14 of the communication system 10, to an input 26 of a communication receiver and tuner circuit, or receiver, 28. The antenna receives informational content carrying communication signals, or communication signals, as well as control signals, on a plurality of different frequency channels respectively associated with the plurality of different base station transceivers 14. The receiver 28 is selectively tuned to the radio frequency channel of the currently servicing base station 14 to demodulate the informational content carrying communication signals to-provide an output 30 that is connected to an input 32 of a processor 34.

The processor 34 processes the communication signals from the current base station presented at input 32 and converts them to corresponding audio signals produced on output 36 of the processor which are then amplified by amplifier 38. The amplifier 38 amplifies the audio signals at input 36 and applies the amplified signals to an input 40 of an acoustical speaker 42. The acoustic speaker 42, in turn, produces an indication of the informational content carried by the communication signals in the form of voice and other sounds represented by the audio signals provided input 40. Alternatively, processor 34 processes output signals other than speech, for example, fax or data. Receiver 28 may digitize received signals and processor 34 processes the digitized signals digitally to extract information. Alternatively, receiver 28 includes an analog demodulator such as a frequency discriminator.

On the transmitting side, voice and other sound input to a microphone 44 are converted to corresponding electrical audio signals that are coupled to an input 46 of a microphone circuit 48 that amplifies the audio signals and applies them to the audio input of the processor 34 Processor 34 digitizes the audio input signals for processing in order to convert them to modulating signals at output 52 that is coupled to input 54 of a modulating transmission signal generating circuit, or transmitter, 56. Processor 34 also generates transmission control signals on another output 58 that are coupled to another input 60 of the transmitter 56. The transmitter amplifies the modulated signals to a transmit power level and applies them through an output 62 to an input 64 of the T/R duplexor 24. The T/R duplexor 24 filters the amplified, modulated signals and applies them to antenna 20 for transmission to the currently serving base station 14. The processor 34 also has an input 66 for receiving manually generated input signals from a keypad 68 and an output 70 on which output display signals are generated and applied to a suitable display screen, or display, 72. A local oscillator and other commonly shared circuits 74 employed by both the receiver 28 and the transmitter 56 provide local oscillator signals to an input 76 of the receiver 28 and an input 78 of the transmitter 56. Processor 34 alternatively processes signals other than speech, such as fax or data, for transmission.

In accordance with the invention, a wideband digitizing circuit 80 is employed to produce digital samples of the carrier signals of all selected base stations 14 within reception range. The wideband digitizing circuit 80 receives at an input 82 amplified wideband signals from an output 84 of the receiver circuit 28. As will be explained in detail below, the wideband digitizing circuit 80 produces digitized samples of the amplified wideband carrier signals at its input 82 and provides the samples on its output 86 to input 88 of the processor 34. The sampling and the provision of the samples by the wideband digitizing circuit is performed in accordance with control signals from output 90 of the processor 34 that is applied to an input 92 of the wideband digitizing circuit 80. The most important control signal is the power enable/disable signal that controls wideband digitizing circuit 80 only to consume power supply current when needed to make a measurement. The processor 34 performs a mathematical analysis of the wideband carrier digitized samples collected on a periodic basis to determine the strengths of signals in the plurality of different frequency channels respectively associated with transmissions from the plurality of base stations 14. Advantageously, this monitoring is performed contemporaneously with communication traffic flowing between the mobile telephone 16 and the current base station 14. The information concerning carrier signal strength of the adjacent base stations 14 is then conveyed to the current base station 14 via the transmitter 56 and the T/R duplexor 24 and antenna 20 in the form of a monitor report which is multiplexed with user traffic.

As previously noted, the wideband digitizing circuit 80 responds to amplified wideband carrier modulated signals obtained from an output 84 of the communication receiver and tuner circuit 28. Referring to FIG. 3, in the preferred embodiment of the invention, the antenna 20, the T/R duplexor 24 and three subcircuits (94, 96, and 98) of the receiver 28 perform a dual function for both the communications receiver 28 and the wideband digitizing circuit 80. The three receiver subcircuits, or elements, of the receiver 28 that are performing dual functions are a low noise amplifier, or low noise amp, 94, an anti-leakage bandpass filter 96 and a tuner pre-amplifier, or tuner pre-amp, 98. The low noise amp 94 receives an unaltered wideband antenna input signal at input terminal 26 of the receiver 28 directly from the antenna 20, FIG. 2, which include the signals from the current base station 14, signals from the adjacent base stations 14, signals from the transmitter 56 of the mobile telephone 16, itself, and electromagnetic signals from all other sources which subsequently get treated as noise.

The T/R duplexor 24 is a band pass filter that passes to the receiver input 26 only signals in the frequency range of all the transmitter frequencies of the base stations 14 of interest, i.e. the selected ones of the plurality of base stations 14 associated with the mobile service center 12. Other signals, within frequency ranges on opposite sides of the selected pass band are excluded. The received signal frequencies that are excluded from the input 26 are the signals from the transmitter 56 of the mobile telephone 16, itself, and all noise outside the passband.

The modulated received signals at receiver input are first amplified by the low noise amplifier 94 and the low noise amplified received signals are then applied to another anti-leakage bandpass filter 96 which excludes any of the signals being transmitted by the transmitter 56 in addition to other frequency bands outside the frequency band of interest. The twice filtered received signal is then again amplified by the tuner pre-amp 98. The tuner pre-amp 98 produces amplified and filtered signals on two outputs. One output 100 is connected to a super-heterodyne down converting mixer 104 and another output 102 is connected to receiver output 84 that is connected to input 82 of the wideband digitizing circuit 80 and the wideband, filtered, amplified, received signals on the two outputs 100 and 102 are substantially the same. The received signal on output 100 is processed in a conventional manner by the super-heterodyne down converting mixer that employs a local oscillator signal applied to receiver input 76 from the local oscillator circuit 74 to produce a frequency down converted signal that is applied to a first intermediate frequency filter 106 which passes only the channel bandwidth of the selected frequency channel to an intermediate amplifier, or IF pre-amp, 108. The IF pre-amp 108 applies the amplified and channel filtered IF signals to an analog-to-digital convertor, or A/D convertor, 110. The A/D convertor produces complex digitized representations of successive signal samples of the received signals and applies them to the receiver output 30 connected to processor input 32. The processor 34 processes the digitized, received, sample stream applied to its input 32 to convert the sample stream to one of speech, fax and user data signals. The T/R duplexor 24 includes a filter section between transmitter output 62 and the antenna 20 that passes transmission frequency band signals while rejecting noise generated in the transmitter in the receive frequency band. The low-noise amplifier 94 amplifies all signals in the receiver band.

Figure 4:
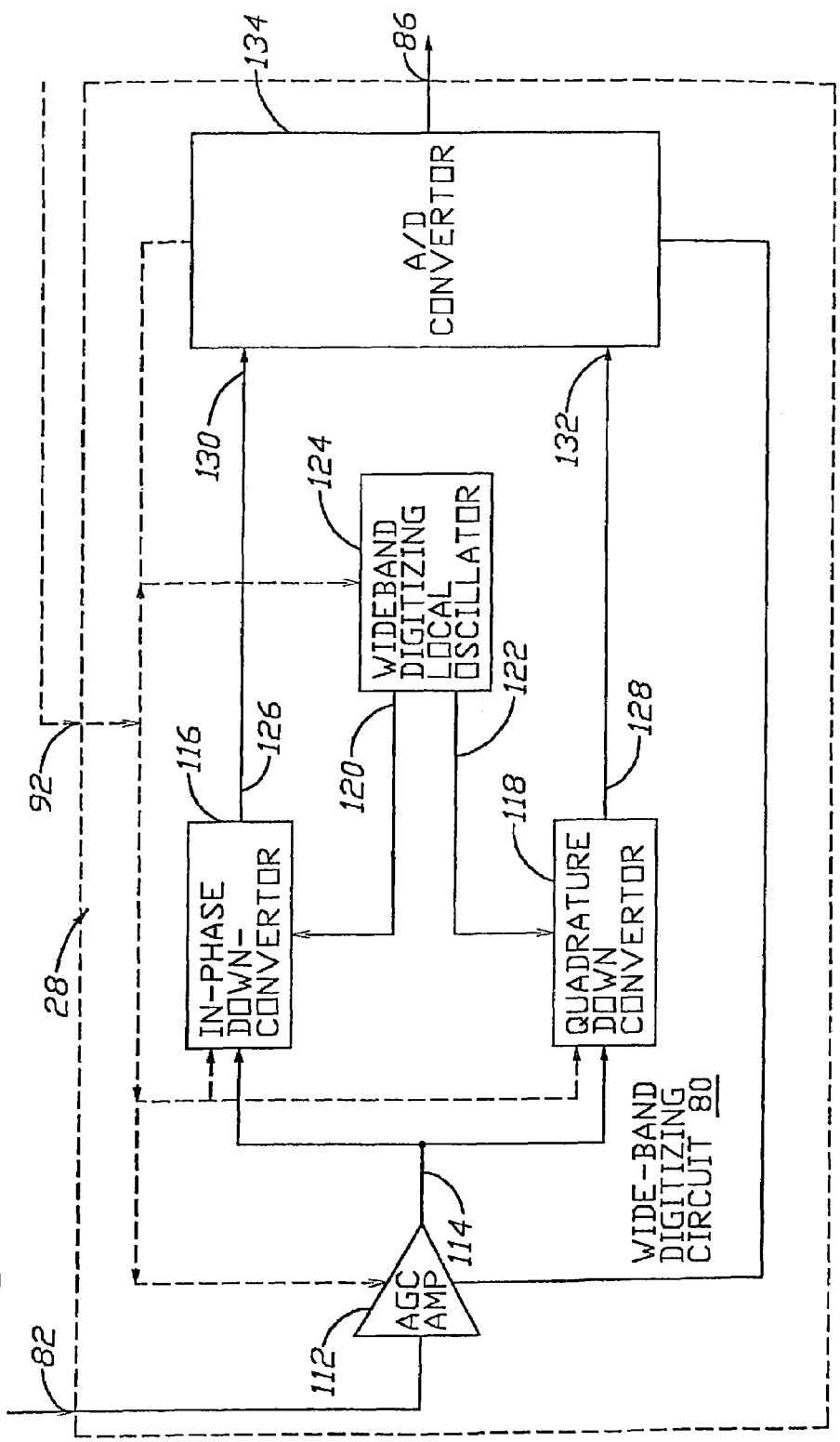
FIG. 4 is a detailed functional block diagram of the preferred embodiment of the wideband digitizing circuit shown only as a single block in FIG. 2.

Referring to FIG. 4, the receiver output 84 carrying the filtered, amplified, received signals from the tuner pre-amp output 102 is applied to the input 82 of the wideband digitizing circuit 80. The wideband received signals at wideband digitizer input 82 are applied to an input of an automatic gain control amplifier, or AGC amp, 112. The AGC amplifier 112 is adjusted in gain by AGC control signal 127 to set the gain so that amplified wideband received signals at output 114 are maintained at an optimum level for digitizing. The amplified wideband received signals on amplifier output 114 are applied to an input of a real, or in-phase, downconvertor 116 and an imaginary, or quadrature, downconvertor 118 both of which mix the wideband received signals at their respective inputs with oscillator signals from outputs 120 and 122, respectively, of a wideband digitizing local oscillator 124. The oscillator signals produced on outputs 120 and 122 are out of phase with, or offset from, one another by ninety degrees to resolve the wideband received signal into real and imaginary vector components produced at the output 126 of the in phase downconvertor 116 and at the output 128 of the quadrature downconvertor 118, respectively. The digitizing local oscillator signals on outputs 120 and 122 are preferably at a frequency near the middle of the receive band in order to minimize the frequency span of the resolved real and imaginary components to a range between zero and half the total bandwidth.

The resolved real, or in-phase, signal and the imaginary, or quadrature, signals on outputs 126 and 128, respectively, are applied to inputs 130 and 132 of a relatively high speed analog-to-digital convertor, or A/D convertor 134. The signal components at inputs 130 and 132 are digitized at a sample rate preferably greater than the Nyquist rate, i.e. greater than twice the bandwidth of either the real signal component or the imaginary signal component. The digitized sample stream is produced on the digitizing circuit output 86 and coupled to the processor input 88. The processor 34 temporarily stores the digitized wideband samples in a sample memory prior to mathematical analysis to determine the strength of the various radio frequency channels in accordance with the software logic flow chart of FIG. 5.

Preferably, the mathematical analysis performed by the microcomputer 34 is a Fourier analysis that determines how much of the total energy of the wideband signal is at each of the different base station transmitter frequencies. The microcomputer then reports in a monitor report the signal strengths of at least the strongest base stations to the current base station 14. Preferably, the monitor report is sent by multiplexing it together with speech information or user data using the so-called slow associated control channel, or SACCH, which is well known in the art of digital cellular telephone systems such as GSM and the U.S. D-AMPS standard known as IS 136 or IS54.

Preferably, Fourier analysis uses the fast Fourier transform, or FFT, which is well known in the prior art. In order to resolve the energy into different frequency channels, the spectral line spacing for the FFT is set equal to the radio channel spacing or to a sub multiple of the radio channel spacing. The spectral line spacing of the FFT is moreover equal to the reciprocal of the time period spanned by the collected sample block. In order to resolve energy into channels spaced by dF Hertz, the sample block is collected during a time of 1/dF seconds, or a multiple thereof. For example, in the U. S. AMPS system, channel spacing dF is thirty-kHz. Accordingly, the time during which samples are collected is 1/30,000 seconds, or 33.3 microseconds, or a multiple thereof, e.g. 66.6 microseconds.

Advantageously, collecting samples for more than the minimum time of 1/dF enables the use of a windowing function to improve discrimination between adjacent channels which is preferably used. The windowing function is a weighting curve that stays approximately level at a high value substantially during the central 1/dF of the total time span, but then falls smoothly to zero at the edges of the sample block. Preferably, the windowing function that is employed is the raised cosine function:

1+COS(Pi*(i−N/2)/N), where "N" is the total number of samples collected, and "i" is the index of the sample with which the value of the function is multiplied to obtain a weighted sample value.

It has been determined that FFT programs operate efficiently when N is a power of two, and therefore, preferably, a power of two samples are collected over a time period, such as 2/dF. The sampling and digitizing rate of the A-to-D convertor should be a power of two times the channel spacing. Thus, the sampling rate is preferably chosen to be the nearest power of two times the channel spacing greater than the Nyquist rate for the total bandwidth that is digitized. For example, if the total bandwidth being digitized is 25 MHz, and the channel resolution required is 30 KHz, the ratio is 833. The nearest power of two above 833 is 1024 or two to the power ten. Samples are therefore taken at a rate of 1024×30 KHz or 30.72 MHz (complex samples), and samples are taken for a duration of (2/30000)-seconds, resulting in 2048 samples, altogether.

After windowing and fast Fourier transform processing, the total broadband energy is resolved into bins of frequency spacing dF/2=15 KHz. However, only even numbered bins (or odd numbered bins) correspond to the centers of 30 KHz channels. Of the 1024 even (or odd) numbered bins, 833 correspond to the channels lying within the receive band of 25 MHz, and the other 191 values correspond to channels not passed by the T/R duplexing filter 24 and the anti-leakage bandpass filter 96, and are discarded. Advantageously, collecting a wideband signal sample block using the wideband digitizing circuit 80 for only 66.7-microseconds, the microcomputer determines the energy in all 833 cellular channels.

The wideband digitizing circuit 80 even if fabricated as part of a larger silicon integrated circuit chip, will consume a significant amount of current while operating. However, it has been determined that it is not necessary to measure the strengths of the adjacent cellular base stations 14, continuously. In fact, it has been determined that sampling as little as once per second is sufficient. Accordingly, in the preferred embodiment of the invention the wideband digitizing circuit is operated only once per second in response to a periodic sample control signal generated by the microcomputer 34 on a control output coupled to input 92 and, in turn, to each of the elements of the wideband digitizing circuit 80. Preferably, the wideband digitizing circuit 80 is operated to obtain samples for only a very small portion of each second, such as for 66.7 microseconds which results in mean power consumption of the digitizing circuit 80 being negligible. For example, even if the current drain of the digitizing circuit 80 is as high as one ampere during operation, operation for only 66.6 microseconds during each second would result in a current drain of only 66.7 microamperes on average. The power needed by the processor 34 to perform a 2048-point FFT once per second is approximately 12×11× 2048 real, fixed point operations, or approximately 0.25 mega-instructions per second, or 0.25 MIPS.

Advantageously, this is a negligible fraction of the microcomputer processor capacity and power consumption, which generally runs at between 10-MIPS and 40-MIPS during a typical digital cellular call. Thus, the mobile telephone 16 of the invention provides a very power-efficient method of making quick signal strength measurements of all alternative frequency channels of adjacent base stations 14. By contrast, the prior art sequential method employed in a noncontinous system in which the cellular phone receiver is periodically retuned to a different, individual one of a plurality of alternative channels during the unused portion of each frame when there is no information transmission or reception taking place, has a power cost as high as that of normal reception. On the other hand, the mean power consumption of the new invention using the broadband digitizing circuit is three orders of magnitude less than that of normal reception, while providing 50 times the scanning capacity of the prior art sequential method.

Because the frequency of a base station that is most strongly received is the primary information being sought, the dynamic range of wideband digitization by the wideband digitizing circuit 80, i.e. the ability to detect a weak signal amid strong signals, may be limited in order to minimize complexity. In some applications, quantizing the In-phase and Quadrature (I and Q) signals from quadrative downconvertors (116, 118) to only a single bit accuracy (their signs) using hard limiters may suffice. In this case A to D convertor 134 would reduce in complexity to only two hard limiters and sampling latches.

In accordance with one aspect of the invention, because sometimes the cellular frequency band of any of the base stations is divided between a number of competing service providers, provision is made to monitor for signals of only the service provider that has provided the subscription of the mobile telephone performing the monitoring function. The mobile phones 16 generally have a subscription with only one of a plurality of service providers although they can receive service from others. In such case, if handoff from a current base station 14 to another adjacent base station is to occur during the progress of a call, the handoff is preferably to another base station associated with the preferred service provider. Pursuant to this aspect of the invention, the range of scanning for other base station carrier signals may be selectively restricted to sub-bands or partial bands used by the selected service provider.

Figure 8:
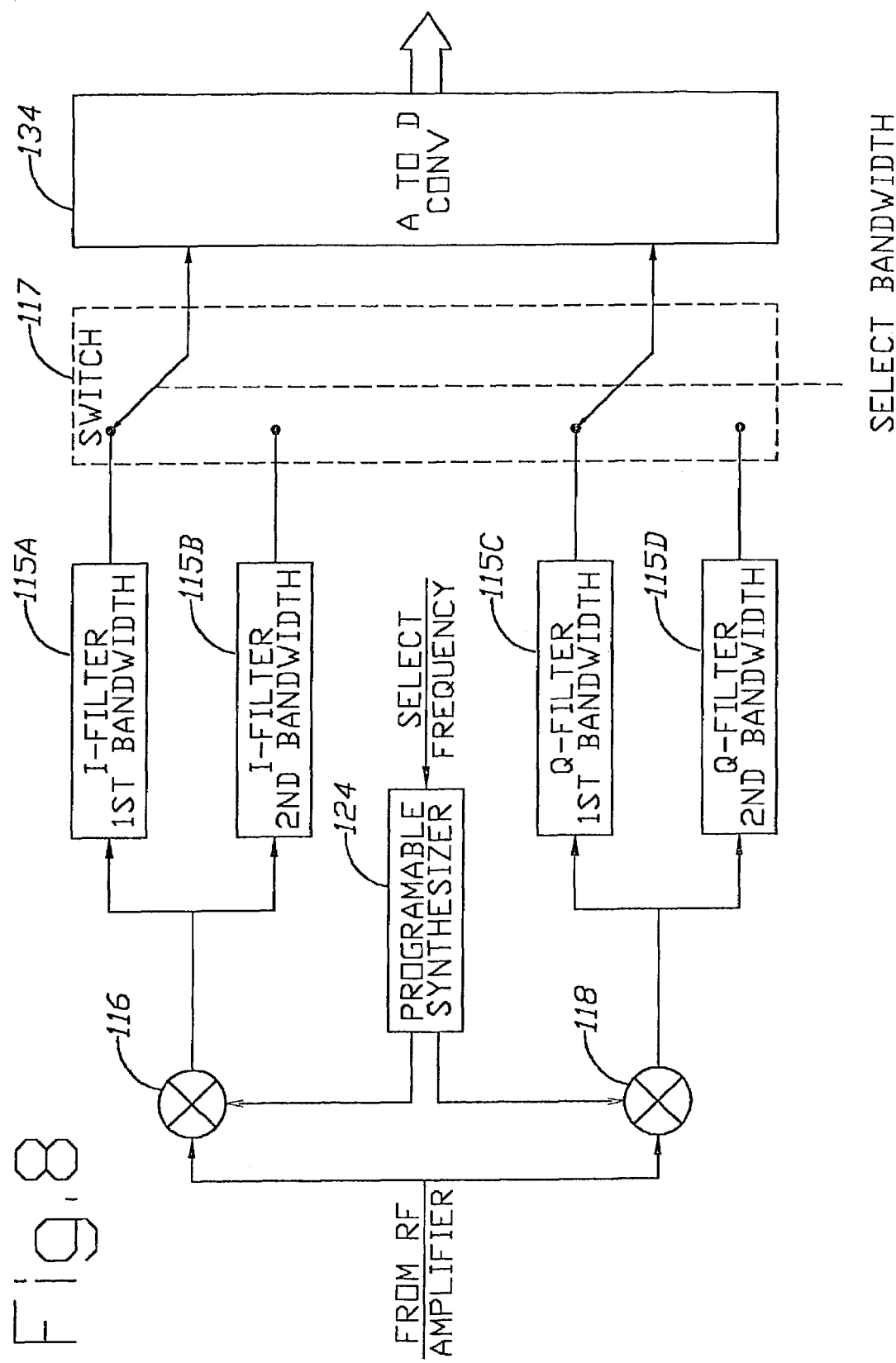
FIG. 8 is a functional block diagram of a wide band digitizing receiver for sub-bands.

The arrangement of the wideband digitizing receiver to select sub-bands is shown in FIG. 8.

The output from the RF amplifying stages (94, 96, 98, 112) is fed to downconvertors (116, 118) where the signal is mixed with quadrature local oscillator signals from frequency synthesizer 124. The synthesizer is programmed to be centered on any channel and preferably between channels. In either case, the synthesizer is programmed to a channel lying near the center of the band or sub-band to be scanned, while deliberately avoiding the channel frequency used by the communications receiver 28, thus preventing interference from the synthesizer 124 to the communications channel. The outputs of downcovertors (116, 118) are then low-pass filtered in filters 115a, 115c or alternatively filters 115b, 115d which have a second bandwidth narrower than the bandwidth of filters 115a, 115c, thus selecting a subband centered around the programmed frequency of synthesizer 124. The filtered signals are then A to D converted in convertor 134. If desired, when a sub-band is selected for processing, for example by controlling switches 117, the sampling rate to A to D convertor 134 may be reduced.

Figure 7:
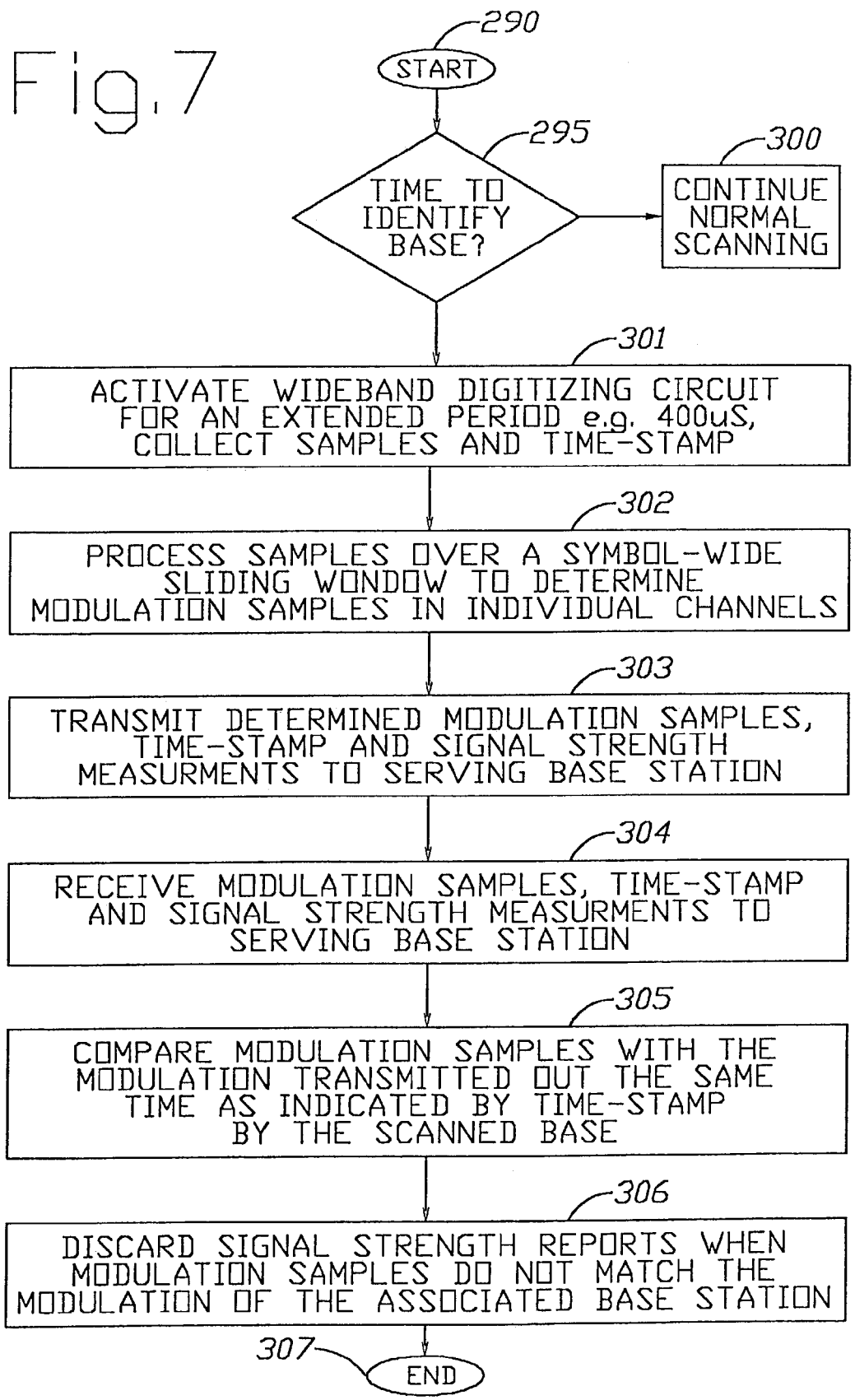
FIG. 7 is a flow chart of a verification of a scanned base ID.

A particular case where the use of sub-band filtering can be advantageous is for implementing the base station identification of FIG. 7. Filters 115b, 115d or yet a third pair of filters (not shown) having a single-channel bandwidth can be provided and selected in combination with a low, single channel sampling rate in A to D convertor 134. This better combination avoids collecting an excessive number of samples in memory when extended scanning is used as part of the identification step which is further described below.

Figure 5:
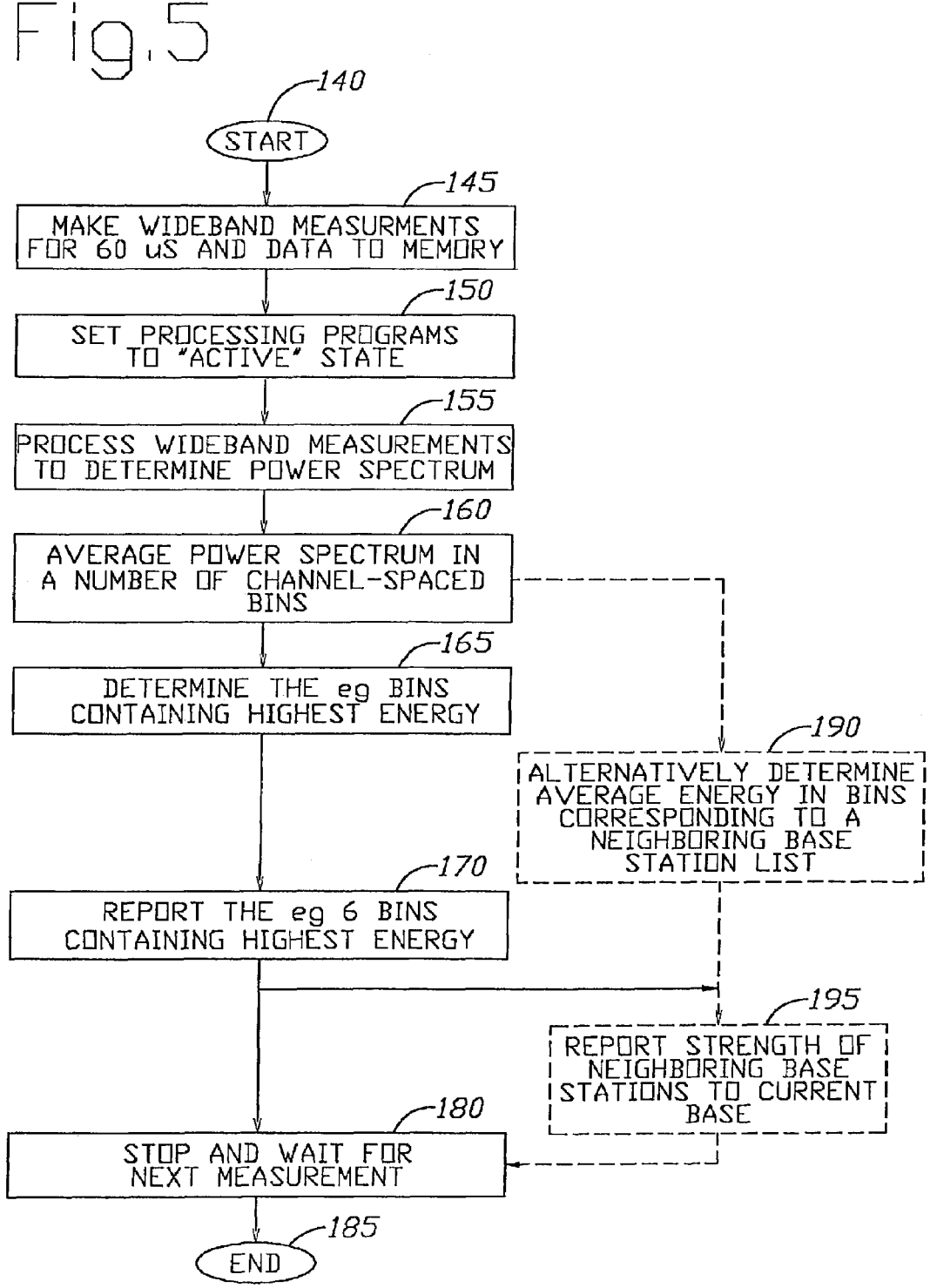
FIG. 5 is a logic flow chart of the preferred computer program employed by the microcomputer of FIG. 2 to monitor and control generation of the wideband samples obtained from the wideband digitizing circuit of FIG. 4 and to transmit the monitor report to the current servicing base station.

Preferably, the identification step is achieved by the microcomputer controlling the wideband digitizing local oscillator 124 to operate at the center frequency of the desired sub-band or other partial band, as shown in the flow chart of FIG. 5. The A/D convertor 134 then digitizes only the signals from the downconvertors 116 and 18 between zero and half the partial bandwidth of the sub-band.

The wideband digitizing circuit 80 is preferably a homodyne type of receiver in which conversion from the radio frequency band to the complex baseband occurs directly in one mixing step in mixers 116, 118. The downconvertors 116 and 118 have a non-zero DC level output corresponding to receiving a signal at the same frequency as that of the wideband digitizing local oscillator 124 thereby giving a falsely high signal reading for that channel. The teachings of U.S. Pat. No. 5,241,702 entitled "D.C. Offset Compensation in a Radio Receiver" issued to applicant on Aug. 31, 1993 deals with compensation for this DC offset problem and is applicable to the present invention and is hereby incorporated by reference.

Alternatively, the wideband digitizing local oscillator 124 is set to operate at a frequency half way between two channels of the cellular frequency band. The DC offset then corresponds to a signal on one of the even (or odd) set of FFT bins that are ultimately discarded.

Alternatively, the DC offset is blocked from entering the A/D convertor 134 by a high-pass filter, or preferably, according to the above incorporated patent, by differentiating circuits.

Other methods of digitizing signals while preserving their complex vector form are described in U.S. Pat. No. 5,048,059 entitled "Log-Polar Signal Processing" also to applicant, issued on Sep. 10, 1991, the disclosure of which is also hereby incorporated by reference herein.

Referring to FIG. 5, in accordance with another aspect of the invention, on a less frequent basis than the sampling rate, a determination is made as to whether a signal of given frequency whose strength is measured is indeed associated with the base station 14 assigned to that frequency or is another signal that coincidentally has the same frequency as the expected base station 14. This process of identifying the base stations 14 associated with measured signals requires Fourier analysis of a longer sample of the signal than required merely to determine signal strength. Preferably, this is done approximately only once every ten seconds by using the communications receiver 26 during a period when speech or other audio communication traffic is not being received in the direction from the base station 14 to the mobile telephone 16. It has been determined that such lulls in conversation occur approximately fifty per cent of the time of a conversation. Due to sharing of the local oscillator circuit 74 between the transmitter 56 and the receiver 28, it is not always possible to retune the receiver 28 without interrupting transmission by the transmitter. Therefore, the receiver 28 is preferably captured for use in identifying another base station 14 during lull periods when actual voice communication traffic is not flowing in either direction, such as occurs at the changeover from one person talking to the another person talking. It has been determined that the loss of voice traffic for the approximately 10–20 ms period needed for identification, is tolerable and hardly noticeable by the users if done only on an infrequent basis. However, the wideband digitizing receiver can also preferably used for identification, as will be further described below.

FIG. 5 is a logic flow chart of the preferred computer program employed by the processor 34 of FIG. 2 to monitor and control generation of the wideband samples obtained from the wideband digitizing circuit of FIG. 4, and to transmit the monitor report to the current serving base station.

In FIG. 5 the method starts at step 140. At step 145 the method makes wideband measurements for 60 μs and direct memory accesses them to memory. In step 150 the processing program is set to an "active" state and then at step 155 wideband measurements are processed to determine the power spectrum. At step 160 averages the power spectrum in a number of channel-spaced bins. At step 165 the method determines the six bins containing the highest energy, and at step 170 the method reports bin numbers and energy to the current base. At step 180 the method stops and waits for the next measurement. The method then ends at step 185. Alternatively, after step 160 the method at step 190 determines the average energy in bins corresponding to a neighboring base station list. Then at step 195 the method reports the strength of neighboring base stations to the current base. The method then proceeds to step 180 where the method stops and waits for the next measurements. The method then ends at step 185.

Figure 6:
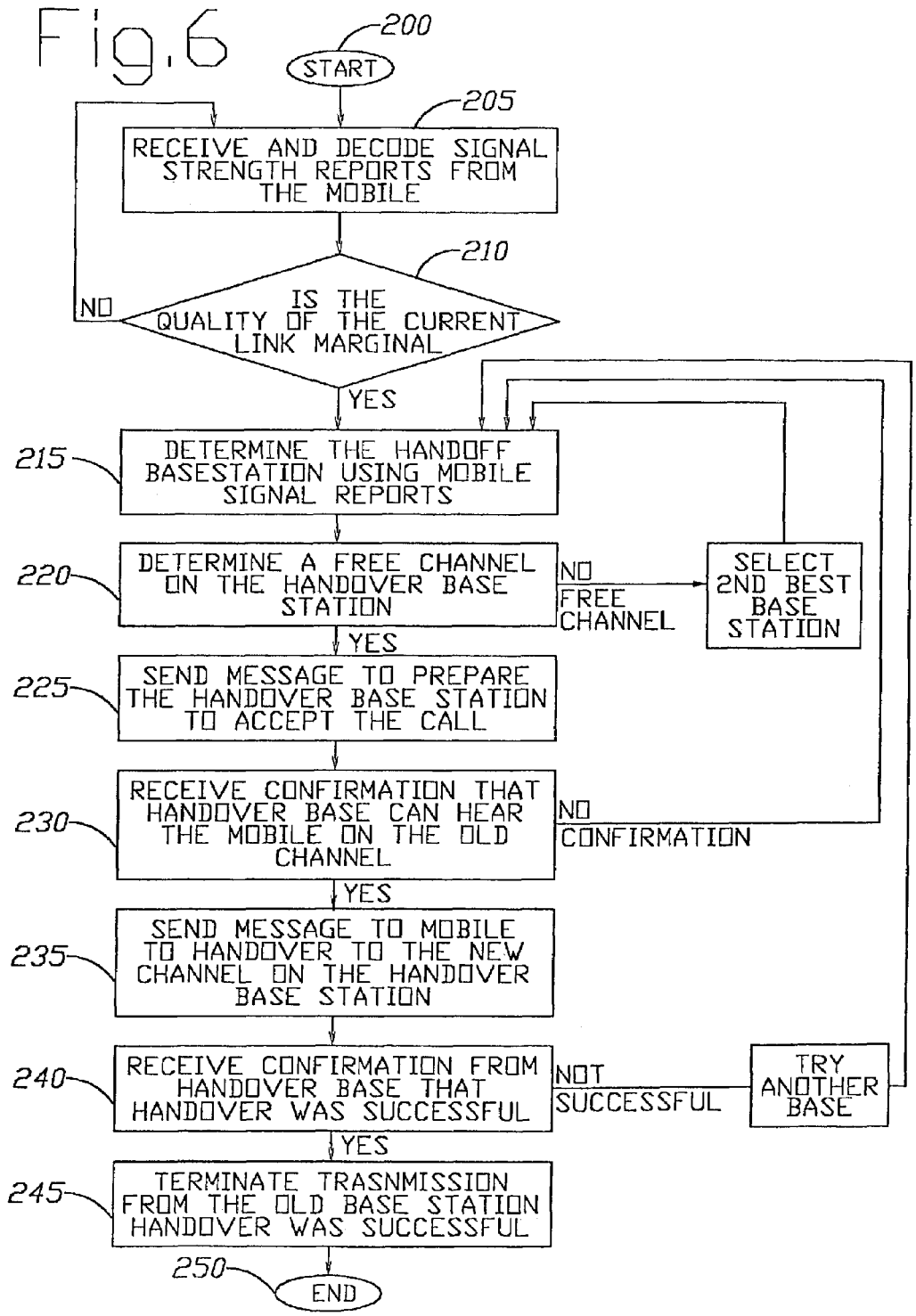
FIG. 6 is a logic flow chart of the preferred operation of the mobile service center of FIG. 1 in response to the monitor report obtained from the scanning mobile telephone to effect the hand-over of service from the current servicing base station to the selected adjacent base station.

FIG. 6 is a logic flow chart of the preferred operation of the mobile service center of FIG. 1 in response to the monitor report obtained from the scanning mobile telephone to effect the hand-over of service from the current servicing base to the selected adjacent base station.

In FIG. 6 the method starts at step 200. At step 205 the method receives and decodes signal strength reports from the mobile. At step 210 the method determines if the quality of the current link is marginal. If not, the method returns to step 205. If yes, the method proceeds to step 215 to determine the handoff base station using mobile signal reports. At step 220 the method determines a free channel on the hand-over base station. If no free channel is available the second best base station is selected and the method proceeds to step 215. If a free channel is available the method proceeds to step 225 where the method sends a message to prepare the hand-over base station to accept the call. The method proceeds then to step 230 where the method receives confirmation that the hand-over base can hear the mobile on the old channel. If confirmation is not available, the method proceeds to step 215. If confirmation is available, the method proceeds to step 235 where the method sends the message to the mobile to hand-over to the new channel on the hand-over base station. The method then proceeds to step 240 where the method receives confirmation from the hand-over base that the hand-over was successful. If not successful, another base is tried and the method returns to step 215. If successful, the method proceeds to step 245 and the message from the old base station is terminated. The method then ends at step 250.

Alternatively, on an infrequent basis, the wideband digitizing circuit 80 is controlled as shown in the flow chart of FIG. 7. The method begin at step 290. At step 295, it is determined if it is time to identify a base. If not, then the method proceeds to step 300 and continues normal scanning. If yes, then the method proceeds to step 301. At step 301, the method collects samples during a slightly more extended period so as to be able to detect at step 302, after processing in processor 34, at step 302, some of the information symbols modulated on the scanned signals. Even in an analog system such as AMPS, the scanned channels are generally selected to be those transmitting the digitally-modulated broadcast control signals, using Manchester Coded, digital frequency modulation. By reporting at step 303 the control channel information symbols detected and the time at which they were observed, the current base station 14 determines at step 305 which other base station was sending those symbols at that time and thereby verifies the identity of the other base station 14, as shown in the flow chart of FIG. 7. Even if, due to lack of a phase reference, it is impossible on the basis of a short signal sample to unambiguously determine an information symbol transmitted, the control processor can decode the signal differentially to determine the polarity of signal change from one information symbol to the next at step 302. This differential decoding when received by the current base station 14 at step 304 is used to identify or not another base station and distinguish it from another source using the same frequency channel but transmitting different information. At step 305, the modulated samples are compared with the modulated signal transmitted by the scanned base at the same time as indicated by the time stamp. At step 306, the signal strength reports are discarded when the samples do not match the modulation of the associated base station with sufficient consistency. The method then ends at step 307.

The advantages of the invention that reduce the power needed for monitoring signal strength and improve the speed of measurement are useful even in TDMA systems and other non-continuous communication systems, but of the greatest importance to analog, FDMA or CDMA systems employing continuous transmission and reception.

Those skilled in the art having the benefit of the present disclosure will appreciate that the present invention may take many forms and embodiments. Some embodiments have been presented and described so as to give an understanding of the invention. These embodiments are merely illustrative and not limiting of the scope of the present invention. Rather, the invention covers all modifications, equivalents and alternatives falling within the spirit and scope of the invention as defined by the appended claims.

The invention claimed is:

1. An improved receiver for receiving communications signals on an assigned frequency channel and monitoring signals received on other frequency channels, comprising:
   an antenna for receiving signals;
   a filter for filtering the received signals and rejecting signals outside a given receive frequency band to produce a filtered signal;
   a communications receiver for processing the filtered signal to select a signal at an assigned frequency for communication and decoding of the selected signal;
   a wideband digitizer responsive to a power enable signal for processing the filtered signal and generating a corresponding stream of numerical samples representing the filtered signal; and
   a control processor for generating the power enable signal at determined intervals for storing the numerical samples and processing the stored samples to determine characteristics of signals on the other frequency channels.

2. The system of claim 1 wherein the receiver is adapted for use in a cellular telephone.

3. The system of claim 2 in which the assigned frequency channel is the frequency channel transmitted by a cellular base station supporting the cellular telephone call to the communications receiver.

4. The system of claim 2 in which the other frequency channels are used by cellular base stations other than that transmitting a cellular call to the receiver.

5. The system of claim 1, in which the filtering means includes a duplexer for connecting the receiver to the antenna and for simultaneously connecting a transmitter to the antenna.

6. The system of claim 1 in which the filter has:
   a cascade connection of filters and amplifiers for amplifying and filtering the receive signals.

7. The system of claim 1 in which the communications receiver decodes code division multiple access signals.

8. The system of claim 1 in which the wideband digitizer includes:
   a wideband oscillator for generating 90-degree phased mixing signals;
   a quadrature downconverter for mixing the filtered signal with the mixing signals to produce at least one of real and imaginary signals and in-phase and quadrature signals; and
   an analog to digital converter for digitizing the in-phase and quadrature signals.

9. The system of claim 8 also including an automatic gain control (AGC) circuit for adjusting the level of amplification prior to the analog to digital converter so that signals are amplified to an optimum signal level for conversion.

10. The system of claim 1 in which the wideband digitizer includes a hardlimiter for producing signal amplitude and phase related information.

11. The system of claim 1 in which the control processor generates the power enable signal for periods of the order of the reciprocal of the frequency channel spacing and at repetition intervals greater than one hundred times the reciprocal channel spacing, thereby reducing power consumption to less than 1% of the operating power consumption when enabled.

12. The system of claim 1 in which the subsequent processing performed by the control processor includes performing a Fourier transform.

13. The system of claim 1 in which the subsequent processing performed by the control processor includes determining a characteristic of least one information symbol transmitted on one of the monitored signals.

14. The system of claim 13 in which the characteristic is a signal change between two information symbols.

15. The system of claim 13 in which the characteristic is used in identifying a selected one of the monitored signals.

16. The system of claim 1 including:
   a first processing means for determining only signal strength in different frequency channels performed with a first periodicity; and
   a second processing for determining signal modulation parameters on at least one channel with a second periodicity.

17. The system of claim 16 wherein the determined modulation parameters are time stamped and including means for transmitting the modulated parameters to a network station.

* * * * *